United States Patent
Lee et al.

(10) Patent No.: US 8,149,369 B2
(45) Date of Patent: *Apr. 3, 2012

(54) IN-PLANE SWITCHING MODE LCD DEVICE

(75) Inventors: Sang Yun Lee, Gyeongsangbuk-do (KR); Woon Sub Choi, Busan (KR)

(73) Assignee: LG Display Co., Ltd., Seoul (KR)

( * ) Notice: Subject to any disclaimer, the term of this patent is extended or adjusted under 35 U.S.C. 154(b) by 405 days.

This patent is subject to a terminal disclaimer.

(21) Appl. No.: 12/500,565

(22) Filed: Jul. 9, 2009

(65) Prior Publication Data

US 2009/0268144 A1 Oct. 29, 2009

Related U.S. Application Data

(62) Division of application No. 11/298,575, filed on Dec. 12, 2005, now Pat. No. 7,616,283.

(30) Foreign Application Priority Data

Jun. 30, 2005 (KR) .......................... 10-2005-0057631

(51) Int. Cl.
*G02F 1/1343* (2006.01)
(52) U.S. Cl. ......................................................... 349/141
(58) Field of Classification Search .................... 349/141
See application file for complete search history.

(56) References Cited

U.S. PATENT DOCUMENTS

| 5,745,207 | A * | 4/1998 | Asada et al. ................ 349/141 |
| 6,459,465 | B1 | 10/2002 | Lee |
| 6,661,493 | B2 | 12/2003 | Chang et al. |
| 2006/0001815 | A1 | 1/2006 | Kim et al. |

FOREIGN PATENT DOCUMENTS

| CN | 1607424 A | 4/2005 |
| JP | 2000-305097 A | 11/2000 |
| JP | 2002-156642 A | 5/2002 |

* cited by examiner

*Primary Examiner* — James Dudek
(74) *Attorney, Agent, or Firm* — Birch, Stewart, Kolasch & Birch, LLP

(57) ABSTRACT

An embodiment of a unit pixel of an in-plane switching (IPS) mode LCD device includes a plurality of pixel electrodes arranged in the unit pixel region, wherein each pixel electrode is configured to apply a pixel voltage from the data line, and a plurality of common electrodes correspondingly arranged in the unit pixel region, wherein each common electrode is configured to apply a common voltage from a common line in parallel with the data line to form electric field in conjunction with the corresponding pixel electrodes. The unit pixel region is vertically divided into over three sub-regions, at least one pixel electrode spans all sub-regions, and a bent angle of the at least one pixel electrode in a sub-region is different from the bent angle of the at least one pixel electrode in an adjacent sub-region, wherein the bent angle is measured relative to the gate line.

12 Claims, 7 Drawing Sheets

IN-PLANE SWITCHING MODE LCD DEVICE

This application is a divisional of U.S. patent application Ser. No. 11/298,575, filed Dec. 12, 2005, now U.S. Pat. No. 7,616,283 which claims the benefit of the Korean Patent Application No. 10-2005-57631, filed on Jun. 30, 2005. The entire contents of each application are incorporated by reference herein.

BACKGROUND OF THE INVENTION

1. Field of the Invention

The present invention relates to a liquid crystal display (LCD) device, and more particularly, to an in-plane switching (IPS) mode LCD device in which liquid crystal molecules are aligned at multiple angles in one unit pixel region to improve response speed without reducing an aperture ratio.

2. Discussion of the Related Art

Recently, flat panel displays have been studied actively including LCD devices. An LCD device varies optical anisotropy of a liquid crystal having fluidity and optical properties by applying electric field to the liquid crystal. The LCD device is widely used owing to features and advantages including being lightweight, a large-sized screen, high resolution, and low power consumption in comparison with a cathode ray tube (CRT).

The LCD device has various operating modes depending on the characteristics of the liquid crystal and the electrode structures. Example modes of the LCD device include a twisted nematic (TN) mode LCD device, a multi-domain mode LCD device, an optically compensated birefringence (OCB) mode LCD device, a vertical alignment (VA) mode LCD device, and an IPS mode LCD device.

In the TN mode LCD device, liquid crystal directors are arranged at a twisted angle of 90° and voltages are applied thereto to control the liquid crystal directors. In the multi-domain mode LCD device, one pixel is divided into a plurality of domains and main viewing angles of the respective domains vary from one another to obtain a wide viewing angle for the device as a whole. In the OCB mode LCD device, a compensation film is attached to an outer surface of a substrate to compensate a phase variation of light depending on a progress direction of the light. In the VA mode LCD device, liquid crystal molecules are vertically arranged on an alignment film using a negative liquid crystal and a vertical alignment film. In the IPS mode LCD device, two electrodes are formed on one substrate and liquid crystal directors are twisted in parallel with an alignment film.

Among them, the IPS mode LCD device includes a color filter array substrate and a thin film transistor array substrate arranged to oppose each other by interposing a liquid crystal layer therebetween. The color filter array substrate is provided with a black matrix layer to prevent light leakage and R/G/B color filter layers formed on the black matrix layer to display colors. The thin film transistor array substrate is provided with gate and data lines for defining unit pixels, thin film transistors formed at each crossing points between the respective gate and data lines, and common and pixel electrodes alternately arranged to generate transverse electric field.

Hereinafter, related art IPS mode LCD devices will be described with reference to the accompanying drawings. FIG. 1 is a plane view illustrating a unit pixel of a first related art IPS mode LCD device, FIG. 2 is a plane view illustrating a unit pixel of a second related art IPS mode LCD device, and FIG. 3 is a graph illustrating voltage-transmittance of the related art devices.

As shown in FIG. 1, a thin film transistor array substrate of the first related art IPS mode LCD device includes gate lines 12 and data lines 15 perpendicularly crossing the gate lines 12 to define unit pixels, thin film transistors 20, and common lines 25. The unit pixel includes, a plurality of common electrodes 24 and a plurality of pixel electrodes 17. The thin film transistors 20 are formed in unit pixels and serve as switching elements. The common lines 25 are formed in parallel with the gate lines 12. The common electrodes 24 branch from the common lines 25 in a single body and arranged along the gate lines 12 in the unit pixels. The pixel electrodes 17 are alternately formed between and are parallel with the common electrodes 24.

One unit pixel region is divided into a plurality of blocks 30 by the pixel and common electrodes 17 and 24. The common lines 25 and the common electrodes 24 are supplied with signals Vcom from the contour of an active region. Each pixel electrode 17 is connected to a drain electrode 15b of each thin film transistor 20 to receive a pixel signal so that liquid crystal molecules in the blocks 30 are rearranged by the transverse electric field formed between the common electrode 24 and the pixel electrode 17.

In FIG. 1, the pixel electrode 17 and the common electrode 24 are arranged along the gate line 12 at an angle α of 10° relative to the gate line (0°). The liquid crystal molecules are initially aligned in a direction of the gate line 12 and then rearranged by the transverse electric field in a direction perpendicular to the pixel electrode 17 and the common electrode 24 to determine transmittance of light. In a general IPS mode device, since the maximum transmittance angle of the liquid crystal molecules is 45° with respect to a rubbing direction, the initially aligned liquid crystal molecules are rotated by 45°-α, i.e., 35° when a driving voltage is applied thereto.

In the first related art IPS mode LCD device as shown in FIG. 1, the unit pixel region is divided into sixteen blocks 30.

However, a problem is present relating to response speed of the first related art IPS mode LCD device. Namely, a response time of the first related art device is slow. To solve this problem, as shown in FIG. 2, pixel electrodes 117 and common electrodes 124 are arranged along gate lines 112 at an angle β of 20° relative to the gate lines 112 (0°) in the second related art device.

In the second related art device, liquid crystal molecules are initially aligned along the gate lines 112 and then rearranged by the transverse electric field in a direction perpendicular to the pixel electrodes 117 and the common electrodes 124. As noted above, the maximum transmittance angle of the liquid crystal molecules is 45° around a rubbing direction. Thus, in this instance, the initially aligned liquid crystal molecules are rotated by an angle of 45°-β, i.e., 25° when the driving voltage is applied thereto in the second related art device. Since rotating the liquid crystal molecules for 25° occurs more quickly than rotating for 35°, the response speed of the second related art IPS mode LCD device is improved over the first related art device.

On the other hand, since each pixel electrode 117 and each common electrode 124 are arranged with a bent angle of 20° relative to the gate line 112 in the second related art device instead of 10° as in the first related art device, the number of blocks 130 of the pixel electrode and the common electrode is reduced to fourteen, which is less than the number of blocks 30 in the first related art device.

In other words, if the arrangement angle of the pixel electrode and the common electrode is increased, the number of electrodes formed in the unit pixel region having a fixed size is correspondingly decreased in the related art devices, thereby reducing the number of the blocks. When the number of blocks, i.e. the number of pixel and common electrodes, is reduced, the luminance is also reduced. Therefore, a tradeoff in the related art devices is that an improvement in the response time comes at a cost of reduction in luminance.

In other words, the related art IPS mode LCD devices have the following problems.

In the IPS mode LCD device in which the common electrode and the pixel electrode are arranged along the gate line, if the common electrode and the pixel electrode are arranged with the bent angle of 10° relative to the gate line, luminance of the device can be improved since the number of blocks can be increased. However, since the rotational angle of the liquid crystal molecules is large, the response speed is decreased.

On the other hand, if the common electrode and the pixel electrode are arranged with the bent angle of 20° relative to the gate line, the response speed of the liquid crystal molecules may be increased. However, the number of the blocks formed in the unit pixel region of the fixed size is reduced due to the increased angle of the electrodes, thereby reducing an opening region of the device.

Another problem is present in related art devices of FIGS. 1 and 2. As shown in FIG. 3 which illustrate voltage-transmittance characteristics of the related art IPS mode LCD devices, the saturation voltages Vsat1 and Vsat2 are both small in width.

SUMMARY OF THE INVENTION

Accordingly, the present invention is directed to an IPS mode LCD device that substantially overcomes one or more problems due to limitations and disadvantages of the related art.

An object of the present invention is to provide an IPS mode LCD device in which liquid crystal molecules are aligned at multiple angles in one unit pixel region to improve the response speed without reducing the aperture ratio and to improve the transmittance-voltage characteristics.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an IPS mode LCD device according to an embodiment of the present invention includes a plurality of gate lines and a plurality of data lines arranged on a first substrate to cross each other, thereby defining a plurality of unit pixel regions where each pixel region is divided into first, second and third sub-regions. The device also includes a plurality of thin film transistors for each unit pixel arranged at each point where the gate lines cross the data lines and a plurality of common lines arranged in parallel with the plurality of gate lines. In each unit pixel, a plurality of common electrodes branch from the common lines and are bent in the first sub-region at a first angle, in the second sub-region at a second angle, and in the third sub-region at a third angle relative to the gate lines. The device further includes a plurality of pixel electrodes connected to a drain electrode of each thin film transistor and arranged in parallel with the common electrodes in the unit pixel. A liquid crystal layer is arranged between the first substrate and a second substrate opposite to the first substrate.

The electrodes in the unit pixels can be bent at different angles in the different sub-regions. For example, the common and pixel electrodes are bent at an angle of 20° in the first sub-region, an angle of 15° in the second sub-region, and an angle of 10° in the third sub-region, so that the liquid crystal molecules initially aligned along the gate line (0°) are rearranged in multiple directions to improve the response speed.

The thin film transistor is arranged in the first sub-region to obtain the optimized number of blocks in the unit pixel region, thereby improving luminance of the device.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
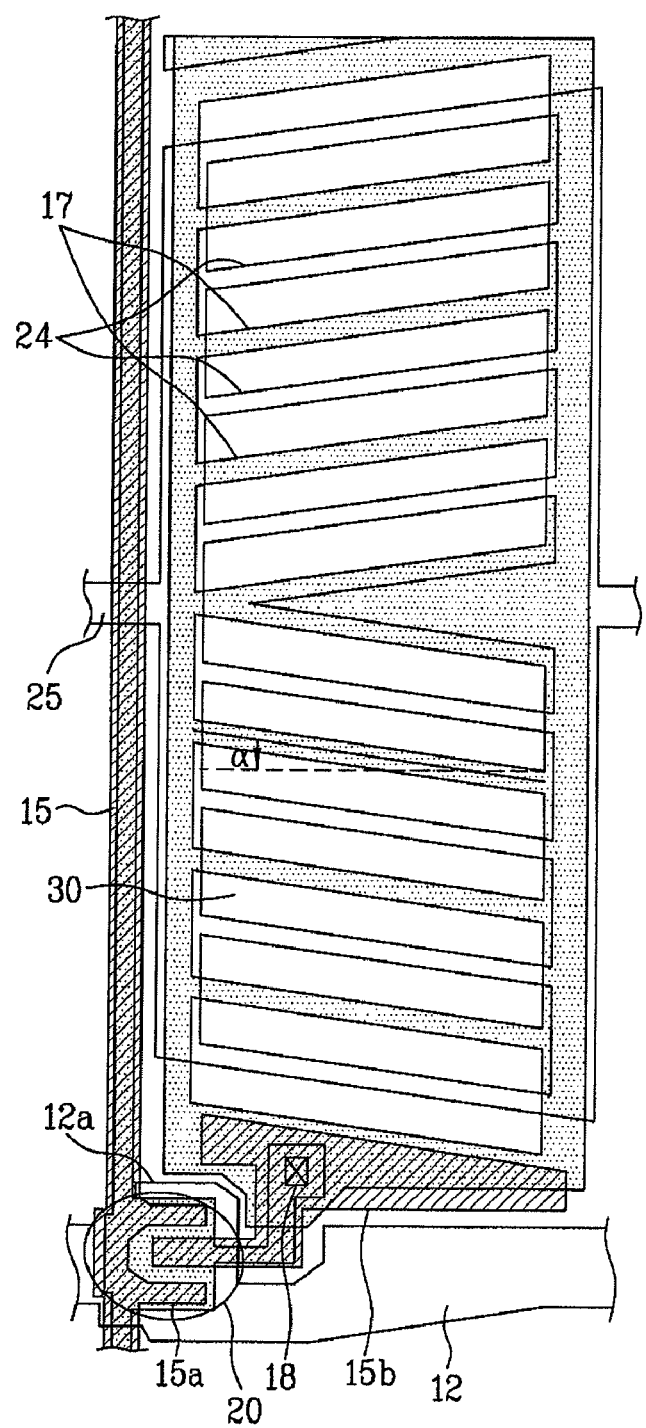
FIG. 1 is a plane view illustrating a unit pixel of a first related art IPS mode LCD device.
Figure 2:
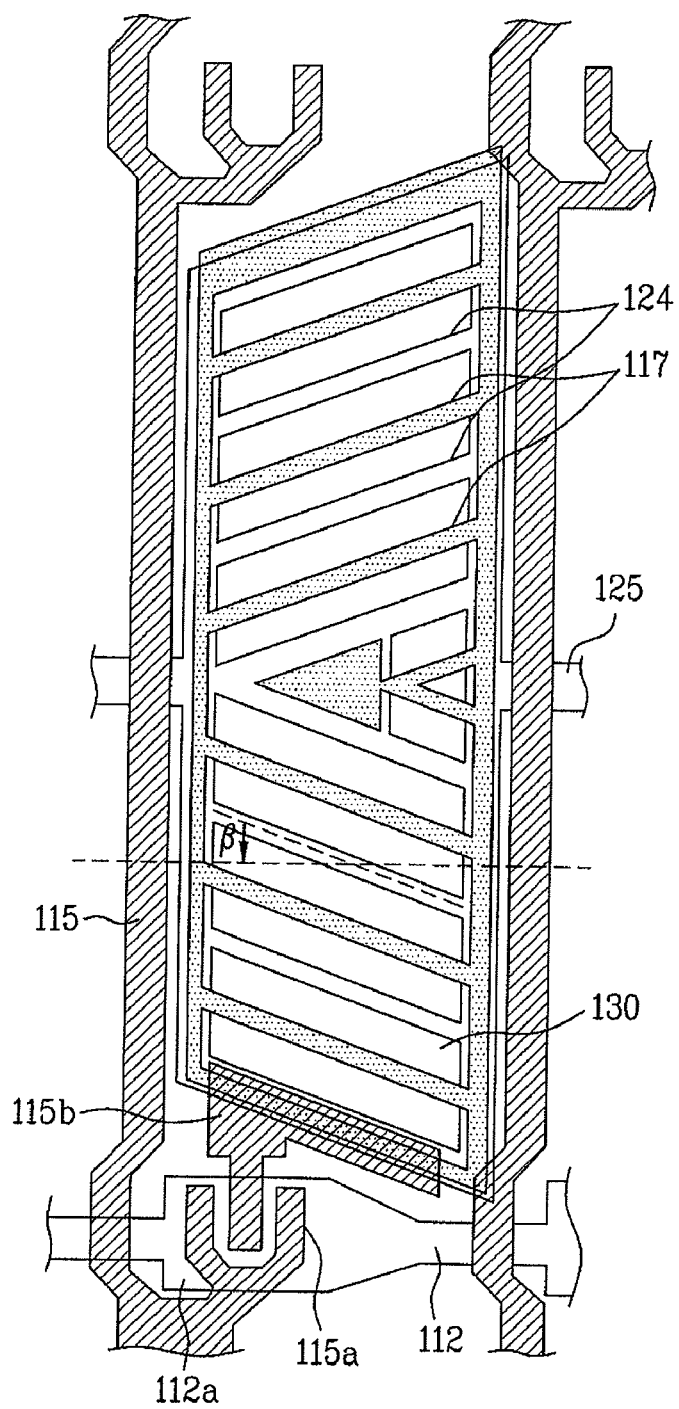
FIG. 2 is a plane view illustrating a unit pixel of a second related art IPS mode LCD device.
Figure 3:
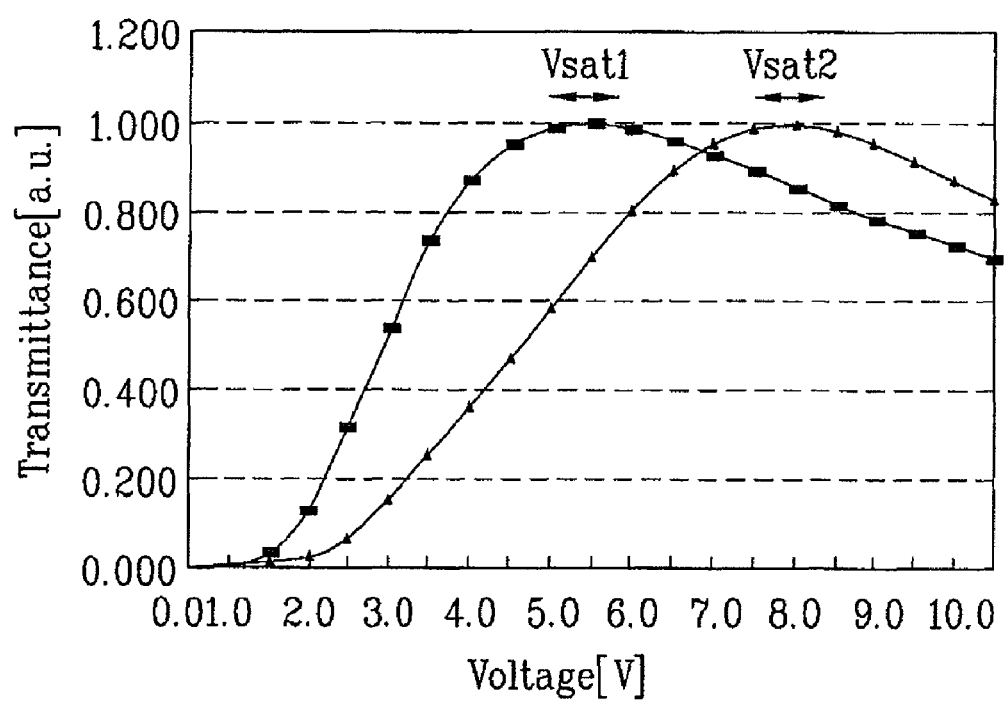
FIG. 3 is a graph illustrating a voltage-transmittance curve of the related art devices.
Figure 4:
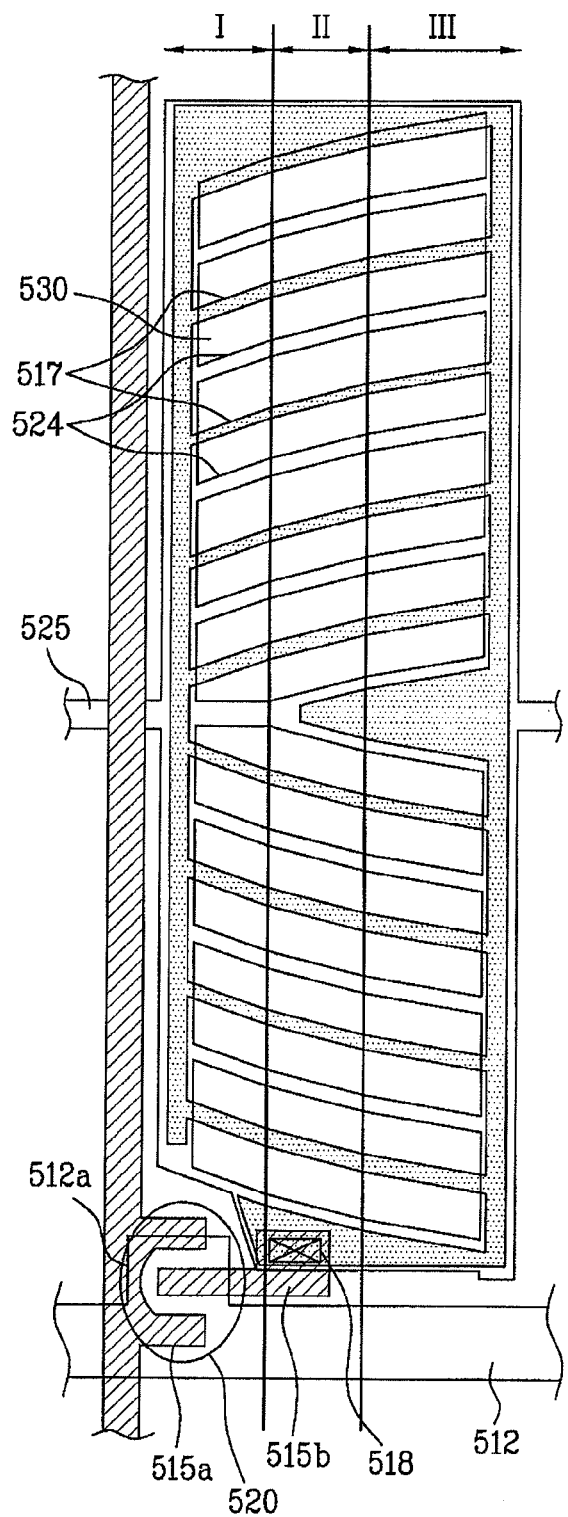
FIG. 4 a plane view illustrating a unit pixel of an IPS mode LCD device according to an embodiment of the present invention.
Figure 5A:
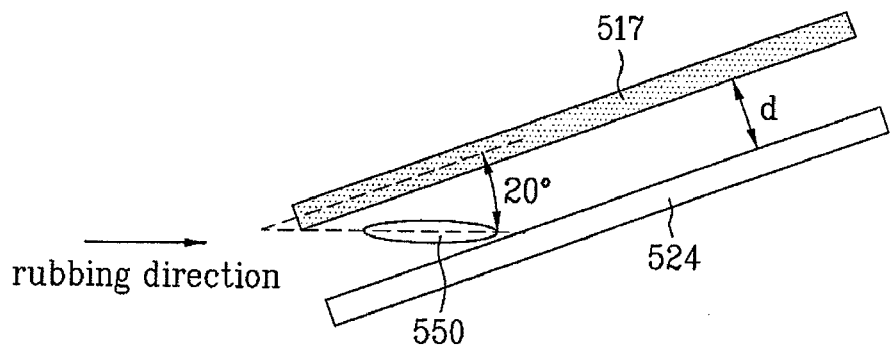
FIG. 5A to FIG. 5C are enlarged plane views illustrating sub-regions I, II and III of FIG. 4.
Figure 5B:
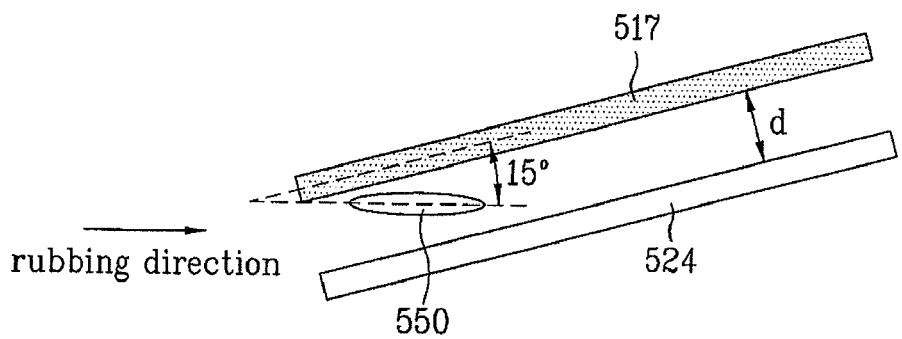
Figure 5C:
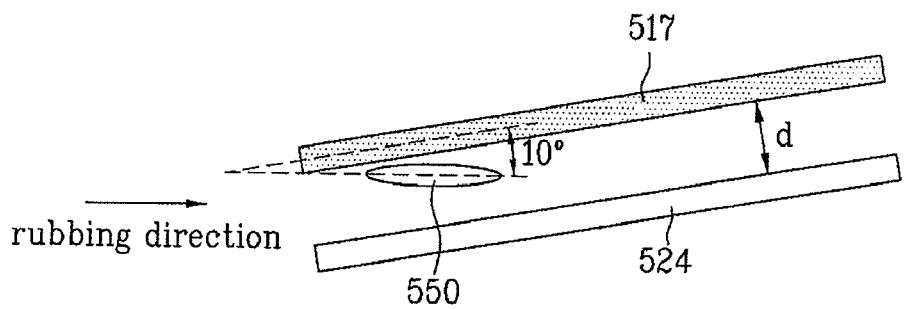
Figure 6:
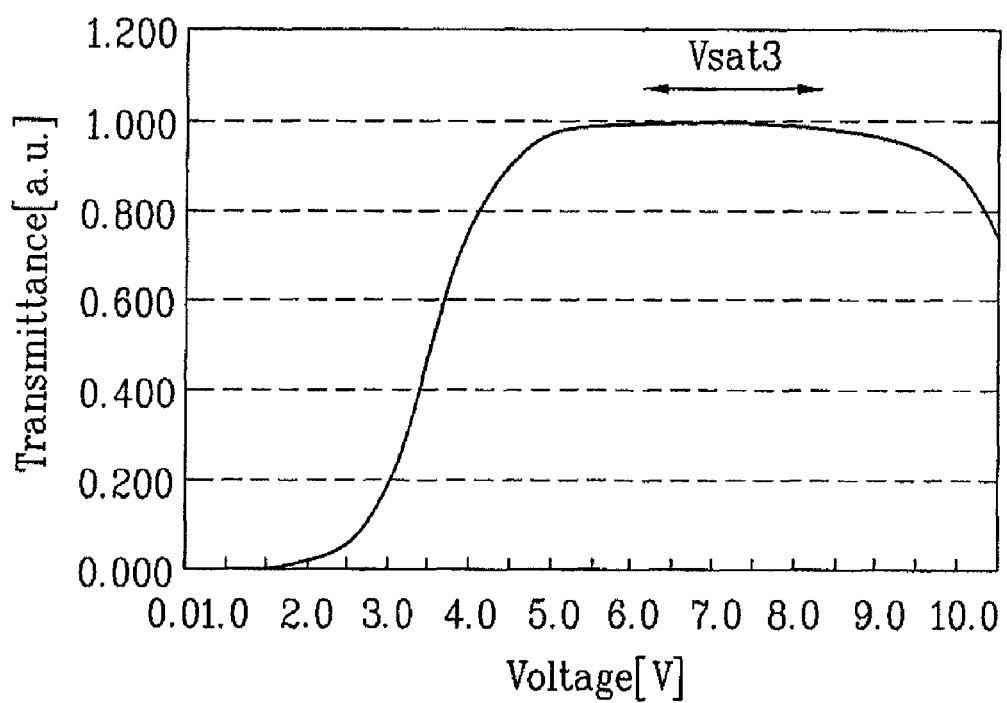
FIG. 6 is a graph illustrating a voltage-transmittance curve of the device according to the embodiment of the present invention.
Figure 7:
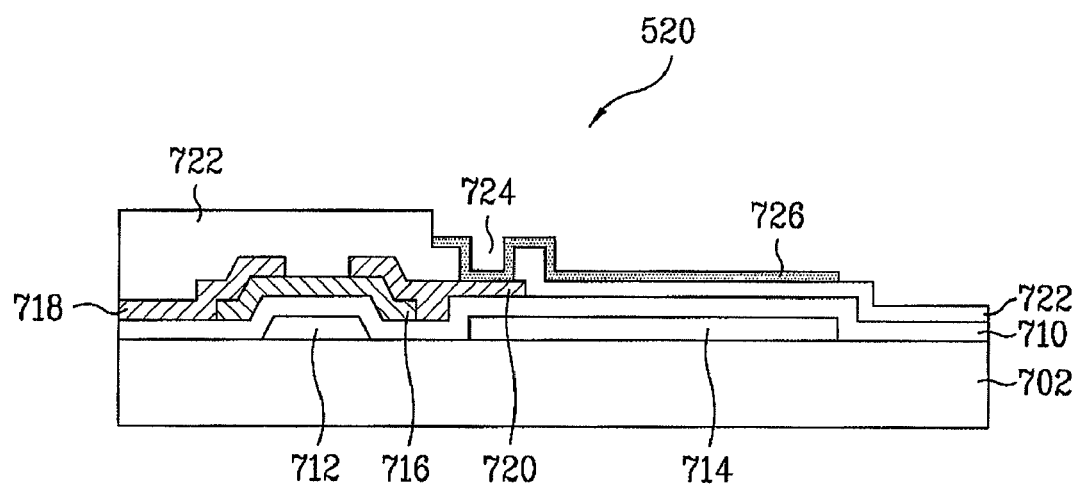
FIG. 7 illustrates an exemplary thin film transistor according to an embodiment of the present invention.

FIG. 4 a plane view illustrating a unit pixel of an IPS mode LCD device according to an embodiment of the present invention, FIG. 5A to FIG. 5C are enlarged plane views illustrating sub-regions I, II and III of FIG. 4, FIG. 6 is a graph illustrating a voltage-transmittance curve of the device according to the embodiment of the present invention, and FIG. 7 illustrates an exemplary thin film transistor according to an embodiment of the present invention.

As shown in FIG. 4, a thin film transistor array substrate of the IPS mode LCD device according to an embodiment of the present invention includes a plurality of gate lines 512 arranged in a direction and a plurality of data lines 515 crossing the gate lines to define unit pixel regions. The device also includes common lines 525. The common lines 525 can be parallel with the gate lines 512 and can be applied with signals Vcom from the contour of an active region. The unit pixel regions are each divided into sub-regions I, II and III.

For each unit pixel, a thin film transistor 520 is included to serve as a switching element. The unit pixel also includes common electrodes 524 branching from the common line 525 to supply the signal Vcom therein. The common electrodes are bent in the sub-regions I, II and III at different angles.

The unit pixel includes pixel electrodes 517 corresponding to the common electrodes 524. Each pixel electrode 517 is connected to a drain electrode 515b of the thin film transistor 520 through a contact hole 518 to form transverse electric field in conjunction with the common electrodes 524.

While three sub-regions are illustrated, this is exemplary only and the invention is not so limited. The number of sub-regions can be two or more.

Referring back to FIG. 4, the common electrodes 524 and the pixel electrodes 517 are arranged to be bent at substantially identical angles with respect to the gate line 512 with each other in each of the sub-regions. Also the bent angles of the pixel and common electrodes 517 and 524 are different in the sub-regions I, II and III. As exemplified in FIGS. 5A to 5C, the common electrodes 524 and the pixel electrodes 517 are bent at an angle of 20° in the sub-region I, at an angle of 15° in the sub-region II, and at an angle of 10° in the sub-region III. The liquid crystal molecules 550 initially aligned along the gate line direction have rubbing effect as much as the bent angle of the electrodes bent at the different constant angles.

Therefore, the liquid crystal molecules 550, initially rubbing-aligned along the gate line (0°), are rearranged by the transverse electric field formed between the pixel electrode 517 and the common electrode 524 at a rotational angle of 45° relative to rubbing direction to determine transmittance of light. When a voltage is applied to the liquid crystal molecules to drive white screen, since the electrode angle is 20° in the sub-region I, the liquid crystal molecules 550 are rotated 25°. Since the electrode angle is 15° in the sub-region II, the liquid crystal molecules 550 are rotated 30°. Since the electrode angle is 10° in the sub-region III, the liquid crystal molecules 550 are rotated 35°. When the electric fields are applied, the liquid crystal molecules 550 in the sub-regions I, II and III are rotated together due to their mutual action caused by viscosity. Therefore, the response speed of the liquid crystal molecules becomes fast. In addition, the driving voltage for driving the liquid crystal molecules can be lowered.

Again, it bears repeating that the embodiments illustrated thus far are examples only. The number of sub-regions are not limited to three. Also, the bent angle of the pixel and common electrodes 517 and 524 are not limited to the particular values illustrated in FIG. 5. It is preferred that the bent angle of an electrode—pixel or common—in a sub-region be different from the bent angle of the same electrode in an adjacent sub-region. It is also preferred that the electrode span all sub-regions to realize the benefits of improved response speed and increased luminance.

Referring to FIG. 6 which illustrates a voltage-transmittance curve of the present embodiment, it is noted that a saturation voltage Vsat3 according to the IPS LCD mode device provided with the electrodes at multiple angles has a width greater than that of the related art IPS LCD mode devices.

As an example, suppose that the saturation voltage required to rotate the liquid crystal molecules rubbed at an angle of 15° from the electrodes at an angle of 45° is 15V (common electrode of 7V). Then the liquid crystal molecules rubbed at an angle of 20° can be driven at a voltage of 14V because they require a difference value of 25° to rotate to the angle of 45°. The liquid crystal molecules rubbed at an angle of 10° according to the present embodiment rubbed also has fast response speed owing to the liquid crystal molecules rubbed at an angle of 20° due to their viscosity. Therefore, the saturation voltage is can be in the range of 14V-15V in the multi-rubbing angle mode. This is a considerable gain in a margin of the driving voltage.

Further, when the common electrodes 524 and the pixel electrodes 517 are arranged with different bent angles in the sub-regions I, II and III, the block 530 between each pixel electrode 517 and each common electrode 524 is maintained at a width d, and the pixel electrode 517 and the common electrode 524 are arranged to be with the same width d.

The common line 525 can be arranged to be in the middle of the pixel region. When this occurs, the pixel and common electrodes 517 and 524 at upper and lower portions of the pixel region are arranged symmetrically about the common line 525. The width-d between the pixel electrode 517 and the common electrode 524 corresponds to a vertical width between the two electrodes. If the length between the respective electrodes is varied, in a normally black mode, the driving voltage is varied when the white screen is driven. Therefore, the length between the respective electrodes is preferred to be maintained uniformly.

As described above, since the pixel and common electrodes at the upper and lower portions of the pixel region are arranged symmetrically with multiple bent angles, a redundant margin occurs at a portion where the gate line crosses the data line in the sub-region I where the electrodes are bent at an angle of 20°. In other words, in the sub-region where the electrodes are arranged with a large bent angle, a redundant space is obtained that maximizes the aspect ratio of the electrodes. The thin film transistor 520 may be arranged in the redundant space to obtain a sufficient margin width of a design area (W/L) of the thin film transistor.

Generally, in a unit pixel region with a plurality of sub-regions, it is preferred that the bent angle of the electrodes in the sub-region closest to the crossing of the gate and data lines—in the region where the switching element is disposed—be the largest. As noted above, this provides the redundant space to maximize the aspect ratio. Along similar lines, it is preferred that the bent angle of the electrodes in a sub-region closer to the gate and data line crossings be greater than the bent angle in a sub-region further from the same crossings.

When the common line is placed in the middle of the unit pixel, it is preferred that the pixel and common electrodes be symmetrically placed about the common line. When this occurs, then for any particular pixel or common electrode, it will have another electrode with substantially identical bent angles and another electrode with substantially symmetrical bent angles with respect to the gate line.

With the pixel electrodes and the common electrodes arranged with multiple bent angles, the unit pixel region can optimally be designed. Therefore, the number of the blocks 530 can be increased to improve the aperture ratio.

The arrangement pattern of the pixel and common electrodes according to the present embodiment has both the advantage of the device with the electrodes arranged with a large bent angle and the advantage of the device with the electrodes arranged with a small bent angle.

Referring back to FIG. 4, the gate lines 512, the common lines 525 and the common electrodes 524 are formed of opaque metal such as Cu, Al, AlNd (aluminum neodymium), Mo, Cr, Ti, Ta and MoW, and are flush with one another. The common lines 525 and the common electrodes 524 can be formed integrally from the same material. Each pixel electrodes 517 is formed of a transparent conductive layer such as indium tin oxide (ITO) or indium zinc oxide (IZO).

FIG. 7 illustrates an exemplary thin film transistor 520 according to an embodiment of the present invention. The thin film transistor 520 includes a gate electrode 712 and a common electrode 714 disposed over a substrate 702. A gate insulating layer 710 is disposed over the gate and common electrodes 712 and 714 and over the substrate 702. Over the gate insulating layer 710 and the gate electrode 712, a semiconductor layer 716 is disposed to serve as a channel of the TFT 520. On one side of the semiconductor layer 716, a drain electrode 718 is formed and on the other side, a source electrode 720 is formed. Over the TFT structure, a passivation layer 722 is disposed. Through a contact hole 724, a pixel electrode 726 is disposed. The gate insulating layer 710 and the passivation layer 722 can be formed by depositing an inorganic insulating material such as SiNx and SiOx using a plasma enhanced chemical vapor deposition (PECVD) method.

The gate electrode 712 can be connected to the gate line 512 of FIG. 4. Indeed, the gate electrode 712 can be formed integrally with the gate line 512. The source electrode 718 can be connected to or can be formed integrally with the data line 515. The drain electrode 720, the contact hole 724, the pixel electrode 726, and the common electrode 714 of FIG. 7 can correspond to the drain electrode 515b, contact hole 518, the pixel electrode 517, and the common line/electrode 525, 524 of FIG. 4.

Storage capacitance is formed at a portion where the common line 525 and the common electrode 524 applied with the signals Vcom are overlapped with the pixel electrode 517 applied with the pixel voltage. In FIG. 7, this corresponds to the pixel electrode 726 overlapping with the common electrode 714. This storage capacitance serves to maintain the voltage applied to the liquid crystal layer during a turn-off period of the thin film transistor to prevent picture quality from being deteriorated by parasitic capacitance.

The thin film transistor array substrate is bonded to the color filter array substrate by interposing the liquid crystal layer therebetween. The color filter array substrate includes a black matrix layer, a color filter layer and an overcoating layer. The thin film transistor array substrate and the color filter array substrate are further provided with an alignment film at their inner sides to initially align the liquid crystal layer along the gate line (0°).

In the embodiment of the present invention, the common and pixel electrodes are arranged with multiple bent angles in multiple sub-regions. For example, the common and pixel electrodes are bent at an angle of 20° in the sub-region I, at an angle of 15° in the sub-region II, and at an angle of 10° in the sub-region III. However, The common and pixel electrodes may be designed at optimized different angles without being limited to above angles.

As described above, the IPS mode LCD device according to the present invention has the following advantages.

First, since the common and pixel electrodes are arranged with multiple bent angles to obtain the multiple alignment angles of the liquid crystals in one unit pixel region, it is possible to obtain an optimized number of the blocks, thereby improving luminance of the device.

Second, since the saturation voltage has an increased width, it is possible to improve transmittance-voltage characteristics.

Third, since the redundant margin is obtained in the sub-region where the common and pixel electrodes are arranged to be with a large bent angle, it is possible to obtain a sufficient margin for the thin film transistor.

Finally, since the common and pixel electrodes are arranged with multiple bent angles, the response speed of the liquid crystal molecules is fast in the sub-region where the electrodes are arranged with a large bent angle. Since the liquid crystal molecules in the adjacent sub-regions mutually act with the sub-region where the response speed of the liquid crystal molecules is fast, the whole response speed becomes fast. As a result, it is possible to lower the driving voltage for driving the liquid crystal molecules.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A unit pixel of an in-plane switching (IPS) mode LCD device, wherein the unit pixel is arranged in a unit pixel region defined by at least one gate line crossing at least one data line, the unit pixel comprising:
    a plurality of pixel electrodes arranged in the unit pixel region, wherein each pixel electrode is configured to apply a pixel voltage from the data line; and
    a plurality of common electrodes correspondingly arranged in the unit pixel region, wherein each common electrode is configured to apply a common voltage from a common line in parallel with the data line to form electric field in conjunction with the corresponding pixel electrodes;
    wherein the unit pixel region is vertically divided into over three sub-regions,
    wherein at least one pixel electrode spans all sub-regions, and
    wherein a bent angle of the at least one pixel electrode in a sub-region is different from the bent angle of the at least one pixel electrode in an adjacent sub-region, wherein the bent angle is measured relative to the gate line,
    wherein each angle of the over three sub regions is gradually decreased,
    wherein a first angle of a first sub region adjacent to the data line is larger than a second angle of a second sub region adjacent to the first sub region and the second angle of the second sub region is larger than a third angle of a third sub-region adjacent to the second sub region.

2. The unit pixel of claim 1, wherein the common electrode corresponding to the at least one pixel electrode also spans all sub-regions.

3. The unit pixel of claim 1, wherein the bent angle of the at least one pixel electrode is largest in a sub-region closest to the crossing of the gate and data lines.

4. The unit pixel of claim 1, wherein the bent angle of the common electrode corresponding to the at least one pixel electrode is substantially identical to the bent angle of the at least one pixel electrode in at least one sub-region.

5. The unit pixel of claim 1, wherein the bent angle of the common electrode corresponding to the at least one pixel electrode is substantially identical to the bent angle of the at least one pixel electrode in all sub-regions.

6. The unit pixel of claim 1, wherein the bent angle of the at least one pixel electrode is substantially identical to a bent angle of at least one other pixel electrode in all sub-regions.

7. The unit pixel of claim 1, wherein the bent angle of the at least one pixel electrode is substantially symmetrical with respect to the gate line to a bent angle of at least one other pixel electrode in all sub-regions.

8. The unit pixel of claim 1, wherein all pixel electrodes and all common electrodes span all sub-regions such that each pair of pixel and corresponding common electrodes have substantially identical bent angles in all sub-regions.

9. The unit pixel of claim 1, wherein all of the common electrodes branch from the common line.

10. The unit pixel of claim 1, wherein all of the common electrodes are integrally formed from a same material as the common line.

11. The unit pixel of claim 1, wherein the common line is arranged to span all three sub-regions in a substantially middle of the unit pixel region.

12. The unit pixel of claim 1, wherein the pixel electrodes and the common electrodes are arranged to be substantially symmetrical with respect to the common line.

* * * * *